United States Patent [19]

Bonemi

[11] Patent Number: 5,045,144
[45] Date of Patent: Sep. 3, 1991

[54] APPARATUS FOR APPLYING STRIPS TO CARDS

[75] Inventor: Jaime Bonemi, Stoughton, Mass.

[73] Assignee: Bostec Systems, Inc., Canton, Mass.

[21] Appl. No.: 535,134

[22] Filed: Jun. 8, 1990

[51] Int. Cl.[5] .................. B26D 5/00; B32B 31/00; B65C 9/00

[52] U.S. Cl. .................. 156/361; 156/362; 156/522

[58] Field of Search ............... 221/184, 238, 268, 270; 226/135, 156, 157; 271/131, 42, 166, 180, 212, 134; 283/904; 156/308.4, 361, 353, 362, 363, 521, 583.8, 583.9

[56] References Cited

U.S. PATENT DOCUMENTS

| | | | |
|---|---|---|---|
| 2,248,744 | 7/1941 | Cohen | 156/353 |
| 3,134,323 | 5/1964 | Stelling, Jr. | 226/156 |
| 3,449,195 | 6/1969 | Girard | 156/583.9 |
| 3,625,801 | 12/1971 | Reed et al. | 156/521 |
| 4,100,011 | 7/1978 | Foote | 156/308.4 |
| 4,149,925 | 4/1979 | Mintz | 156/362 |
| 4,420,355 | 12/1983 | Saur | 156/521 |
| 4,676,682 | 6/1987 | Schacht | 271/131 |

FOREIGN PATENT DOCUMENTS

| | | | |
|---|---|---|---|
| 0149542 | 7/1985 | European Pat. Off. | 283/404 |
| 2815551 | 11/1978 | Fed. Rep. of Germany | 271/131 |
| 3729920 | 3/1989 | Fed. Rep. of Germany | 271/137 |
| 63-171760 | 7/1988 | Japan | 271/180 |
| 804115 | 2/1981 | U.S.S.R. | 226/157 |

OTHER PUBLICATIONS

Nelson, G. E., "Retractable Card Bail"; *IBM Technical Disclosure Bulletin*, vol. 13, No. 7, pp. 1975-1976, Dec. 1970.

Primary Examiner—David A. Simmons
Assistant Examiner—Jeffrey G. Payne
Attorney, Agent, or Firm—Wolf, Greenfield & Sacks

[57] ABSTRACT

An apparatus for applying a strip material to the surface of plastic card stock. Blank plastic card stock pieces are stored and then transferred in a downstream direction from the storage location. A predetermined length of strip material from a source is supplied in response to the transferral of card stock. The strip material is located in an overlay position on each of the plastic card stock pieces. Downstream of the supply process, strip material is cut to a predetermined length upon the card. Immediately downstream of this cutting, a spot tacking operating occurs in which the overlaid strip material is lightly adhered to the card stock surface. Finally, downstream of the tacking operation, the strip material is permanently adhered to each of the plastic card stock pieces. The strip material may be a paper-like surface suitable for signatures, and the adhering process may be performed by means of a moving lamination head that applies a high temperature and pressure to the area of the strip. The completed cards may then be cooled and finally stacked for output.

37 Claims, 12 Drawing Sheets

APPARATUS FOR APPLYING STRIPS TO CARDS

BACKGROUND OF THE INVENTION

1. Field of the Invention

This invention relates to an apparatus for applying a strip material to the surface of a plastic card and, more particularly, to the adhesion of security signature strips to the reverse side of credit cards.

2. Background of the Invention

It is often desirable in the field of plastic card making, such as credit cards, to provide a separate strip of material to a given side of the card. Often the strip of material is utilized to allow signatures or other written information to be included on the reverse side of the card in order to enhance its security. Current methods for applying signature strips to the reverse sides of cards rely upon the transferring of pigments or other suspensions to the surface. Such methods have a distinct disadvantage in that the pigments can be removed and reapplied fairly easily, resulting in a readily forgeable card.

It is, therefore, desirable to provide a method by which a paper-like strip material may be directly applied to the surface of the card. Such a material would be significantly more difficult to alter and hold signatures written thereon with increased longevity and durability.

A method for applying magnetic tape strips to the surface of a card is disclosed in U.S. Pat. No. 4,149,925. This method involves the continuous feeding of cards to a heated wheel that simultaneously receives and overlaid magnetic strip from a source reel. The elements of the strip feeding system are all belt driven and operate continuously in synchronization with the motion of the cards through the overlay station.

A similar method for applying magnetic strips is disclosed in U.S. Pat. No. 4,231,828. This method, again, involves the synchronous application of the magnetic strip to a moving card from a group of overriding rollers. Heat from one of the rollers is simultaneously applied to reel the strip. Neither of the methods disclosed is particularly effective when used in conjunction with a paper-like material. This lack of effectiveness results because more heat and pressure is required in the application of paper-like material than is necessary for thin plastic magnetic tape. As such, an apparatus that applies heat to the strip for a longer interval of time and at a higher pressure, and does so in a continuous manner, is required.

SUMMARY OF THE INVENTION

It is therefore an object of the present invention to provide an apparatus for continuously applying a strip material to the surface of input pieces of plastic card stock where adhesion of the strip material to the card stock requires a significant degree of applied pressure and temperature.

It is another object of this invention to provide an apparatus that applies strip material to a large number of plastic card stock pieces with a minimum of human interfacing.

It is another object of this invention to provide an apparatus that incorporates a large number of interchangeable parts and operating stations for maximum versatility of the plastic card stock strip production process.

It is another object of this invention to provide an apparatus that applies strip material to the surface of plastic card stock in a manner that maximizes the security of the card.

It is yet another object of this invention to provide an apparatus that applies strip material to the surface of plastic card stock in a relatively fast and continuous process.

The present invention provides an apparatus for applying a strip material to the surface of plastic card stock. There are means for storing blank plastic card stock pieces. There are means for transferring in a downstream direction these plastic card stock pieces from the means for storing. There are also means positioned downstream of and responsive to the means for transferring for supplying a predetermined length of strip material from a source at a position overlaid on each of the plastic card stock pieces. There are means positioned downstream of these means for supplying for cutting the strip material to a predetermined length, and also means, positioned immediately downstream of these means for cutting, for spot tacking the overlaid strip material to the card stock surface. There are means, positioned downstream of the means for spot tacking, for permanently adhering the strip material to each of the plastic card stock pieces.

In a preferred embodiment, the apparatus may comprise a means for transferring card stock that includes rail mean for directing the card stock through the apparatus. The means for transferring may also include a reciprocating sliding finger means for pushing the card stock pieces out of the means for storing and consecutively down the rail means. This means for storing may include a means for stacking the card stock pieces having an adjustable baffle system for separating a stack of card stock pieces into a larger and significantly smaller stack. The smaller stack is positioned in direct proximity to the sliding finger means. The means for supplying strip material may include a pinch roll set means to bias the strip material. Additionally, the means for supplying may comprise a first and second pinch roll set means geared together to allow the first set to input strip material from a source and also to allow the second set to subsequently output strip material to overlay the plastic card stock. A loop of slack strip material is disposed between the first and second pinch roll sets in order to store slack strip material between input and output. The means for supplying strip material can include a supply reel holding a large quantity of strip material.

The first and second pinch roll sets may, additionally, each include a gear having a clutch bearing means that allows complete slippage in one direction of rotation and complete transfer of torque to the pinch roll set in an opposite direction of rotation corresponding to the direction of strip material feeding. Each of these first and second pinch roll sets may also include at least one roller having a clutch bearing means that allows the roller to travel only in the direction of strip material feeding. The first and second pinch roll sets may also include a gear driving means that is a translating gear rack interconnected with one of the gears.

The means for transferring cards and the gear drive means may each include a linear motor. These motors may operate in conjunction with each other and may both contain a means for adjusting their stroke travel.

The cutting means may include a moving cutting head that contacts and withdraws from the surface of the strip material. Furthermore, the spot tacking means may include a moving heating element means mounted above the overlay position of the strip material to contact and withdraw from the surface of the strip material, thus, spot tacking it to the plastic card stock. Similarly, this spot tacking means may include a linear motor to bring the heating element into contact with the overlaid strip material and subsequently withdraw it. The cutting means may include a cutting control means that operates a spot tacking means just prior to operation of the cutting means itself, so that strip material is cut only after it has been secured to the plastic card stock surface.

The means for adhering strip material may include a moving lamination head means positioned to contact with a predetermined pressure the plastic card stock in the location of the tacked and cut strip material. This lamination head means may itself include a heating block means having an adjustable electrical heater to provide lamination heat to the lamination block. The heating block may also include a removable end die shaped to accurately overlay the strip material on the plastic card stock and constructed of a material with high thermal conductivity. The area between the heating block means and the remainder of the lamination head means may contain an insulation means to reduce unwanted heating loss from the heating block to the rest of the apparatus. The rail means may include, disposed therebetween and positioned relative to the lamination head means, a heat resistant backing block to allow laminating pressure to be applied to the plastic card stock. Similar to other operating elements in the system, the lamination head means may be brought into contact with the strip material by a linear motor. Any of the linear motors herein may be a pneumatic actuator. To regulate the heating block temperature to a predetermined value, the heating block means may include a temperature probe.

The lamination head means may also include a rotational position adjustment controller to allow changes in the rotational position of the heating block within the plane of the plastic card stock. Similarly, the lamination head may also include an angular adjustment means that allows alteration of the contact angle of the heating block relative to the plane of the surface of the plastic card stock.

A preferred embodiment may further comprise a means for cooling the permanently adhered strip material positioned downstream of the lamination means. This means for cooling may be a multi-ducted venturi shaped air flow source positioned to deliver air flow to the surface of the plastic card stock.

There may be, positioned downstream of the cooling means, an output stacking means to collect the completed plastic card stock pieces. This output stacking means may include a means for adding new plastic card stock pieces to the bottom of the stack. The output stacking means may include spring loaded baffles to support the bottom of the stack above the level of the rails while allowing the addition of new plastic card stock pieces to the bottom of the stack by raising the completed card stock pieces above the level of the rails using the means for adding.

The finger means may include a shock absorbing adjustable stop to regulate the distance of travel of the sliding finger. The apparatus may also include a static electricity removal means positioned directly downstream of the means for storing to neutralize static on the plastic card stock, ensuring a higher degree of cleanliness. Each of these plastic card stock pieces may be a single commercially accepted credit card style card, and the strip material may be composed of a paper like material.

More particularly, the means for supplying the strip material may include first and second pinch roll sets in which the first set includes two cylindrical rollers of equal diameter and the second set includes three cylindrical rollers in which the driven roller is larger in diameter than two non-driven guiding rollers. These guiding rollers may include at least one, and potentially two or more more channels, disposed about their perimeter that are machined to the approximate width of the desired strip material. Furthermore, these rollers may be removable.

BRIEF DESCRIPTION OF THE DRAWINGS

The foregoing objects and advantages of the present invention will be more clearly understood in connection with the accompanying drawings in which.

DETAILED DESCRIPTION OF THE PREFERRED EMBODIMENT

Figure 1:
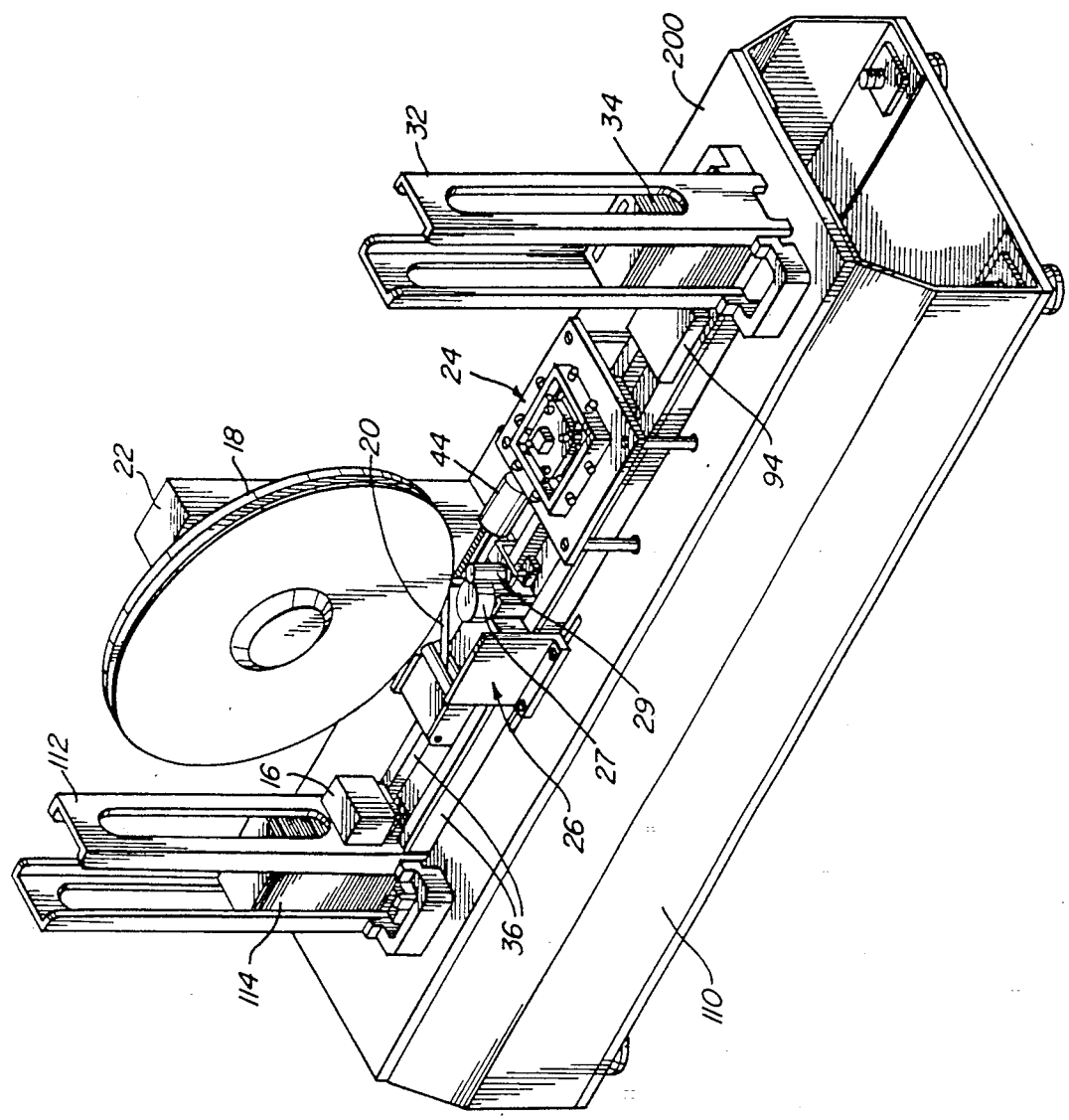
FIG. 1 is a perspective view showing the apparatus and its cabinetwork according to this invention.

A self contained apparatus for applying strip material to card stock is shown in FIG. 1. The various operating process elements of this apparatus are placed linearly upon a cabinet 110 having a sturdy top plate 200. In this embodiment, plastic card stock pieces in the general shape of credit cards 114 are stacked in a frame 112. These cards are fed down a pair of rails 36 from the source stack 112 past an anti-static device 16 and into a tape application unit 26. This tape application unit inputs strip material 20 from a reel 18 supported by a beam 22. Downstream of this tape application unit are located a cutting unit 27 and a spot tacking unit 29 for holding the tape in place while it is cut to a predetermined length for each card stock piece. Further downstream of this tape application unit 26 is the thermal lamination element 24 which consists of a moving lamination head that applies high temperature and pressure to the tacked strip material to permanently seal it to the card stock surface. Downstream of this lamination element 24 is located an venturi shaped air cooling unit 30 that provides for quick cooling of the laminated card stock piece prior to output. Cards are output to a stack 34 formed within an output stacking frame 32. The system allows stacks of card stock pieces to be continually loaded into source frame 112 and unloaded from the output frame 32 in a continuous process of manufacturing.

Figure 2:
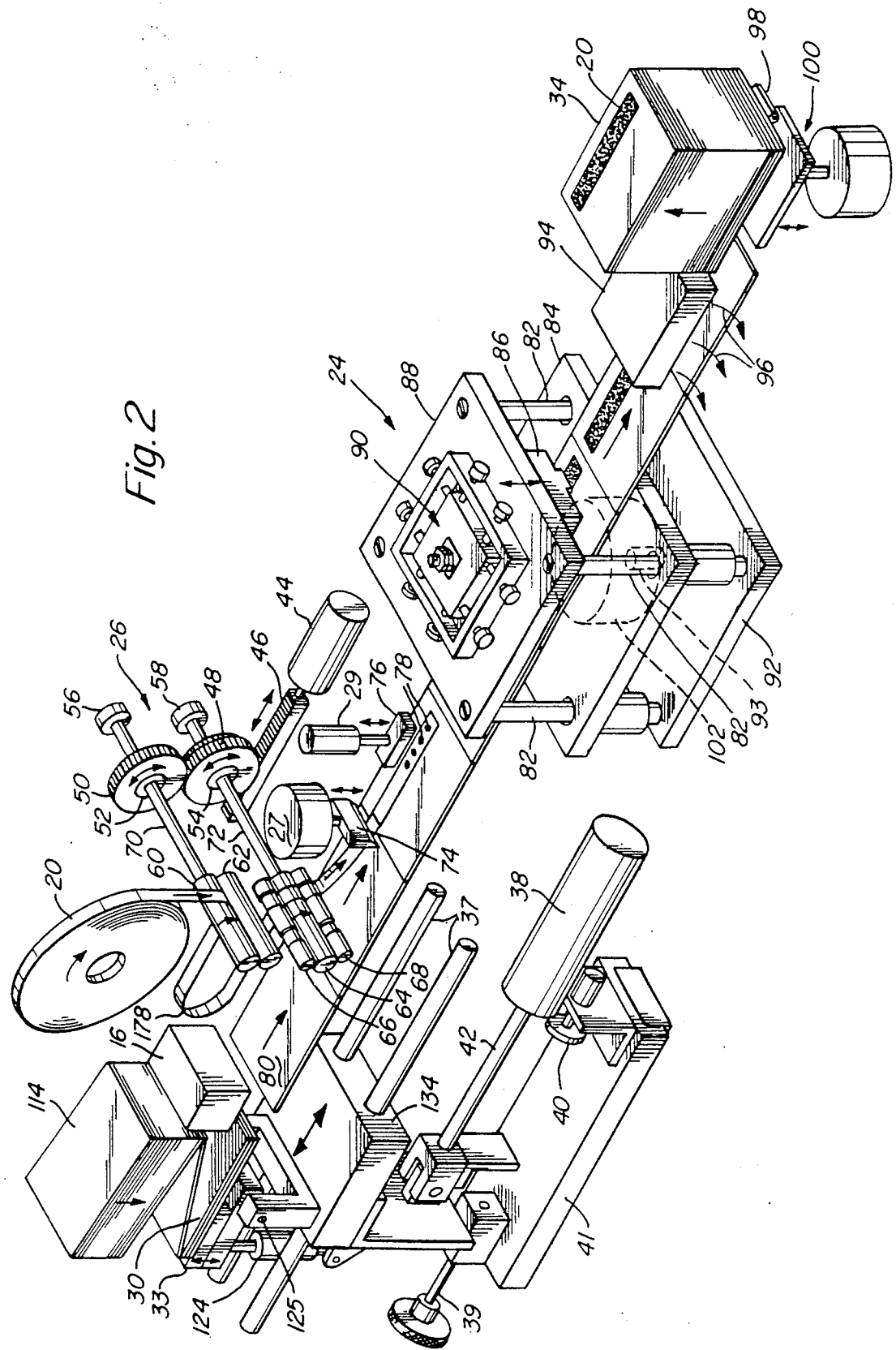
FIG. 2 is a more detailed view of the various operational elements of the apparatus shown in FIG. 1.

FIG. 2 is an exposed view of the apparatus as depicted in FIG. 1. The cabinet 110 and top plate 200 as well as certain operational element side plates have been omitted to fully expose the operational elements of the apparatus. Arrows are provided to describe the direction of motion of the various elements as the process progresses. Generally, a stack of cards 114 falls, one card at a time, to a smaller stack 30 in the frame 112 that is small and lightweight enough to allow quick and effective removal of individual cards for travel down processing rails 36. The rails 36 are shaped as channels with a low friction surface to firmly and freely guide the card stock pieces. The cards are removed by a sliding finger 33 interconnected with a pillow block 34 that moves along guide rails 37 in response to a linear motor 38 having a connecting rod 42. The exact positioning of the finger is controlled by an adjusting screw 39 that moves a carriage 41 containing a stop 40 with a shock absorber that limits the travel of the finger 33.

Cards 80 are directed end to end along the rails 36 under an anti static device 16, for dust prevention, and then under the strip application element 26. This element contains two sets of pinch rollers, an upper 60 and 62 and a lower 64, 66 and 68 set, with one roller of each set driven by a shaft 70 and 72, respectively. The shafts 70 and 72 are each interconnected to a drive gear 50 and 48, respectively. The lower drive gear 48 is interconnected with a gear rack 46 that reciprocates, translating forward and backward in response to a linear motor 44. Each of the drive gears 50 and 48 is mounted to the outer race of a clutch bearing 52 and 54 respectively. These clutch bearings, that have inner races firmly mounted to each of the drive shafts 70 and 72, allow torque to be transmitted to the pinch rollers in only one direction while rotation in the opposing direction results in total slippage relative to the shaft. Similarly, the ends of the drive shafts 70 and 72 are each supported by clutch bearings 56 and 58, respectively, that only allow the shaft driven rollers to rotate in the gear driving direction.

In this embodiment, the upper driving pinch roller 60 is set to rotate only when the rack 46 is pulled toward the linear motor 44. Similarly, the lower driving pinch roller 64 is set to rotate only when the rack is pushed away from the linear motor 44. Both rollers rotate clockwise relative to FIG. 2. In this manner, strip material 20 is reeled into the element with each inward stroke of the linear motor, but it is at no time reeled back to the reel by an opposing stroke of the linear motor which, instead, simultaneously outputs the reeled in material to overlay the card. A strip material loop 178 holds the slack between motor strokes. The application element's linear motor 44 may be synchronized with the card pushing finger's linear motor 38 to simultaneously advance a card and reel out a predetermined length of strip material that overlays the card.

The overlaid strip material, once reeled out, must be applied to the card stock and cut. The cutting of each piece of strip material to fit upon a card is performed by a cutting unit 27, located just downstream of the strip application element 26, that contains a reciprocating cutting head 74. Before cutting, to ensure that the material remains accurately aligned upon the card, a spot tacking unit 29 applies heat to small spots 78 along the tape material 20 to hold it in place. It accomplishes this by melting the underlying card at these spots.

As illustrated in FIG. 2, the tape material 20 is shown being tacked to one of the cards. The cutting mechanism is shown in position. The cutting mechanism is operated to cut the strip after tacking. The strips that remain on the card are generally of a shorter length than the length of the card and to accommodate the strips properly positioned on the card there is a difference in the speed of movement of the tape material relative to the card at least after the cutting operation occurs. This enables the strips to be located as shown by the card in FIG. 2 that underlies the tacking unit 29. In an alternate arrangement, the cutting mechanism could provide two cuts per card but this would then involve the use of waste tape material.

Subsequent to the overlay and tacking of strip material, the card stock pieces are transferred to the thermal laminating element 24 for permanent attachment of the strip. This unit consists of a head piece 88 upon which is located an adjustable frame 90, itself attached to the laminating heating block 86. The head piece 88 is supported by four posts 82 that are connected at their lower ends to a base plate 92. The downward application of force to this base plate moves the heating block into pressurized contact with the tacked strip material. The block contains a die which is heated to a fairly high temperature causing an even melting of the plastic card stock beneath the area of the strip material resulting in firm adhesion of the plastic and the strip material to each other. The laminating block is then disengaged from contact with the card stock surface and the card moves on to a venturi cooling element 94 that passes air over the surface of the card as shown by the air flow arrows 96.

Cards are finally placed into an output stack 34 supported above the level of the rails 36 by spring loaded baffles 98. A lifting element 100 pushes each completed card above the level of the spring loaded baffles to rest upon the bottom of the stack when the pushing element is again withdrawn.

Figure 3:
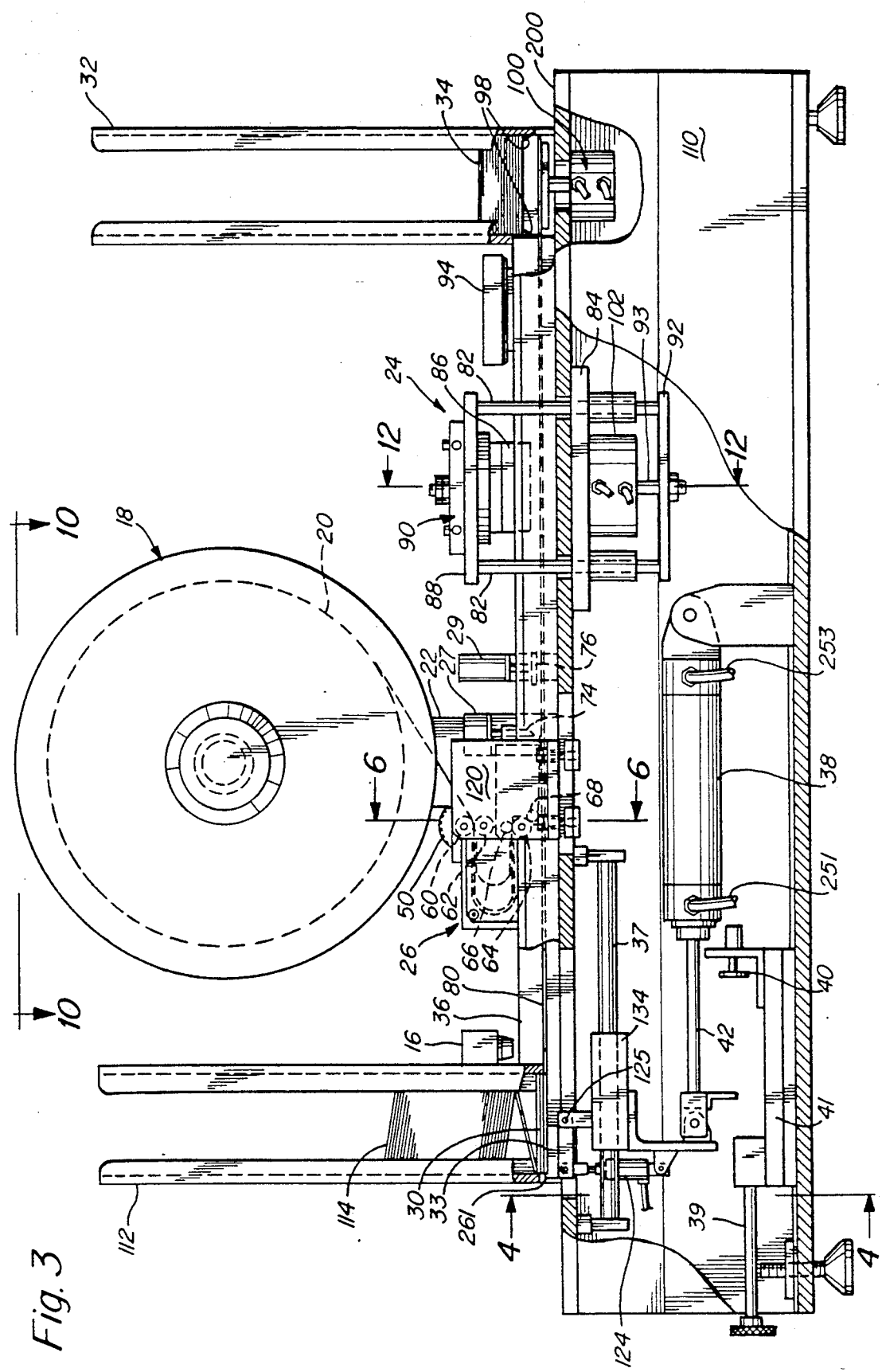
FIG. 3 is a more detailed exposed side view of the apparatus shown in FIG. 1.

As shown by the cross sectional side view in FIG. 3, each of the elements are positioned in a linear fashion to perform a continuous stream of functions to cards passing through them. The details of the mechanism of the finger device 33 are clearly visible with the cabinet 110 omitted. In particular, the finger device 33 is pivoted at a point 125 in response to a small linear motor 124. This motor 124 allows the finger 33 to be disengaged from contact with a card in the source stack 30 while the finger is returning from a pushing operation to prepare to push the next card. The finger is, therefore, free to return without its raised pushing rear shoulder 261 contacting the downstream edge of the card.

The positioning of a linear motor 102 beneath the laminating head element 24 is also clearly visible in FIG. 3. Movement of the linear motor shaft downward (relative to the figure) places the laminating heating block 86 in contact with a card surface. Note that each of the linear motors depicted in this figure include a pair of fluid lines (as shown, for example, by hose elements 251 and 253 on finger linear motor 38). These lines may be used to carry pressurized air to power pneumatic actuators.

Figure 4:
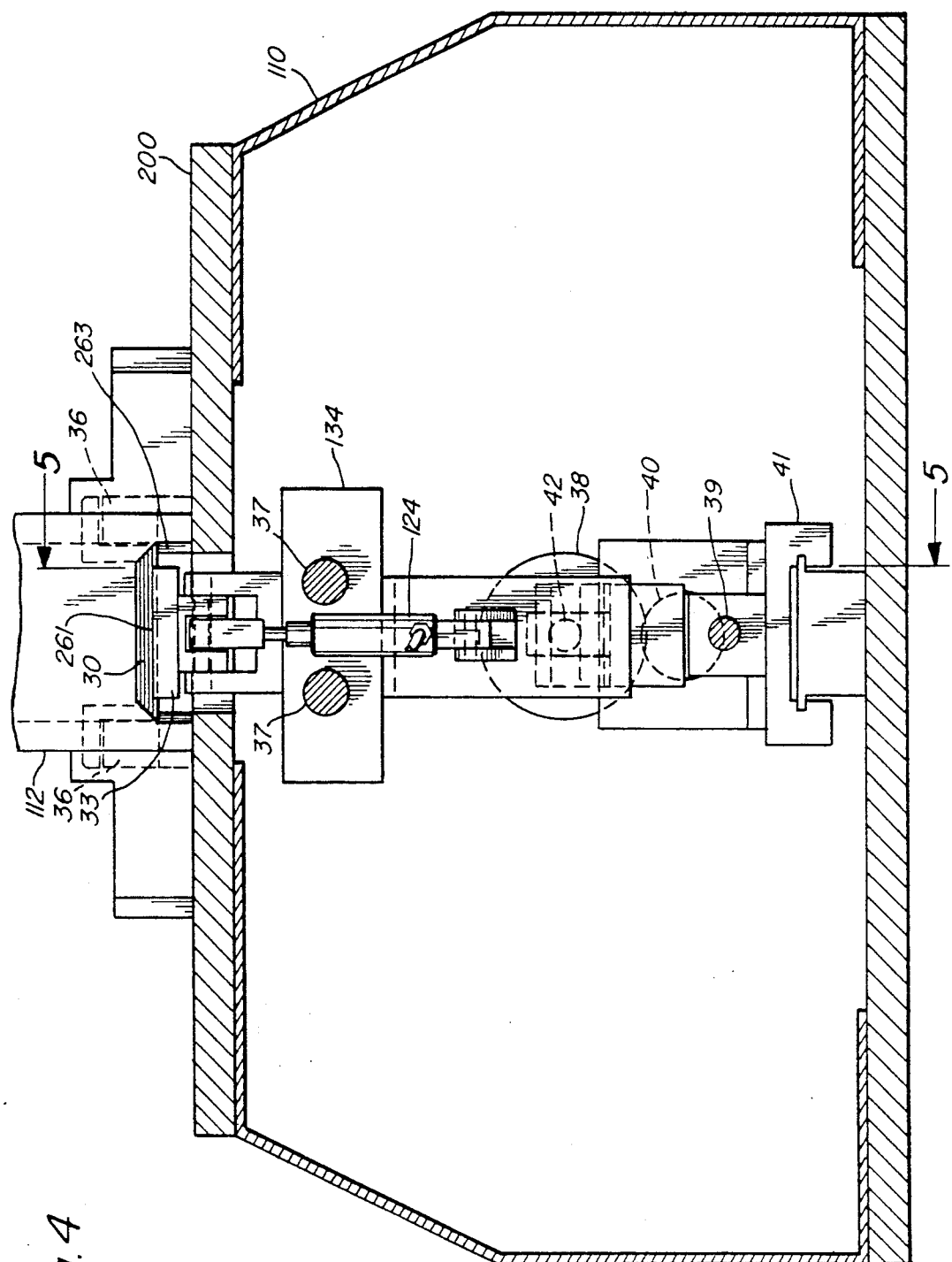
FIG. 4 is a cross-sectional front view of the card transferring elements of the apparatus shown in FIG. 3.

The elements of the finger apparatus are depicted in a cross-sectional front view in FIG. 4. The finger unit 33 in this figure is shown in a position ready to propel a new card from the stack 112 into the processing stream. Thus, the raised rear shoulder of the finger 261 is disposed at an elevation above the level of the rail base 263 to contact the upstream edge of a source stack card.

As already noted, at the end of each stroke, the finger unit pivots upon a point 125 out of interfering contact with the level of the rail 263. This operation is detailed in FIG. 5. A side view of the finger mechanism after having just completed the transfer of a card from the stack 30 down the processing rails 36 is shown. The ready position of the finger mechanism with the finger extended to an interfering position relative to the bottom card stack is shown in phantom 140.

Figure 5:
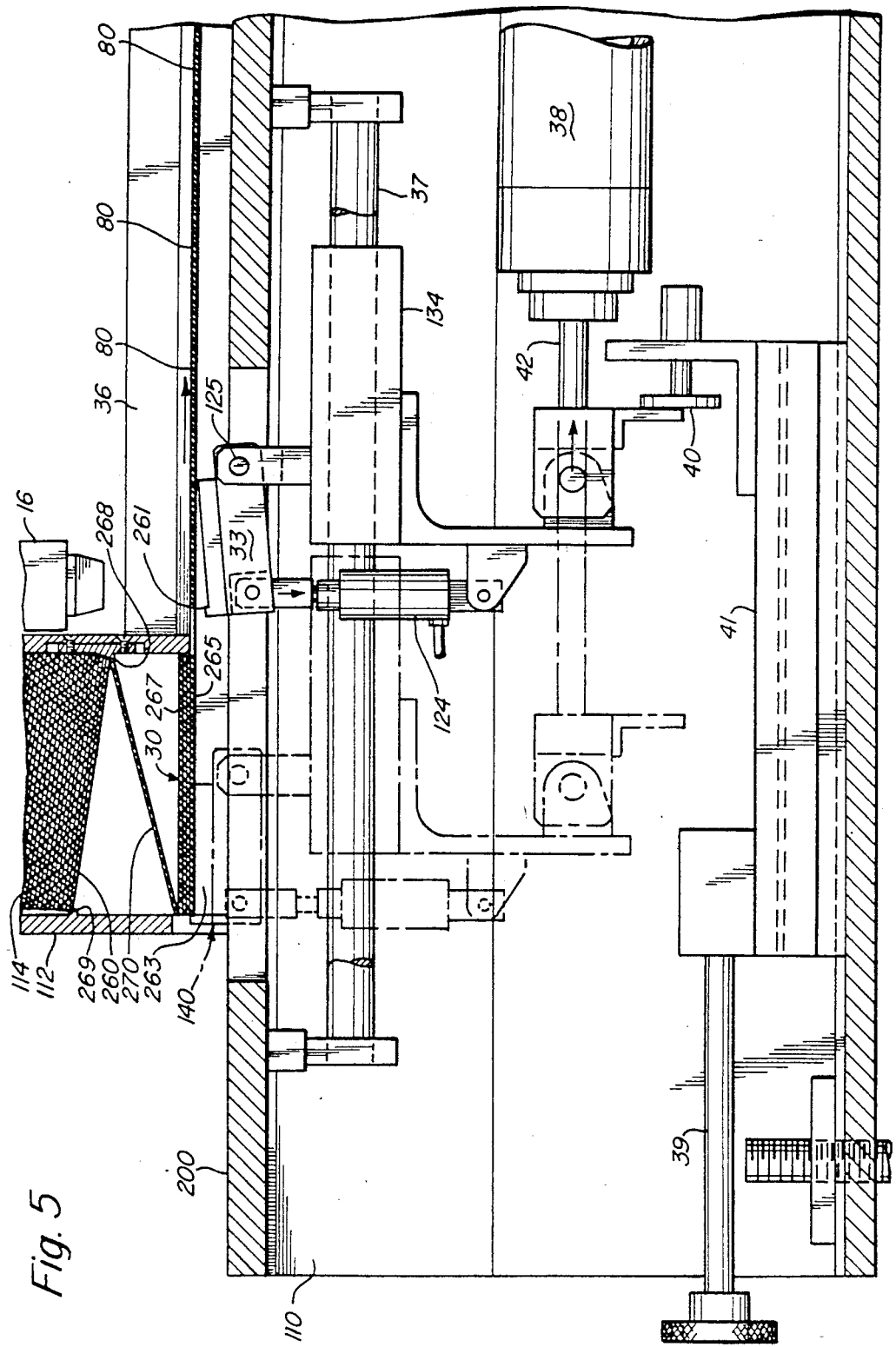
FIG. 5 is a partial exposed side view depicting the operation of the card transferring elements shown in FIG. 4.

The division between the main source stack 114 and the feeding stack 30 which is maintained using intervening baffles 268 and 269 is also shown in detail in FIG. 5. The main source stack 114 rests upon the pair of baffles 268 and 269 at an angle from the plane of the apparatus base 200. Each time a card 265 is removed from the bottom of the feeding stack 30 by the finger unit 33, a half fallen card 270 from the bottom of the source stack 114 attains an angle that allows it to slip off the one baffle 268 still supporting it to rest completely upon the feeding stack 30. As each card is fed, another half fallen card 270 falls flat 267 onto the top of the feeding stack 30 and another card 260 from the bottom of the main source stack 114 takes the place of the now completely fallen card to become a half fallen card 270. This secondary feeding stack 30 is small enough and lightweight enough that the finger element 33 is able to transfer cards down the rails 36 without significant frictional resistance.

Figure 6:
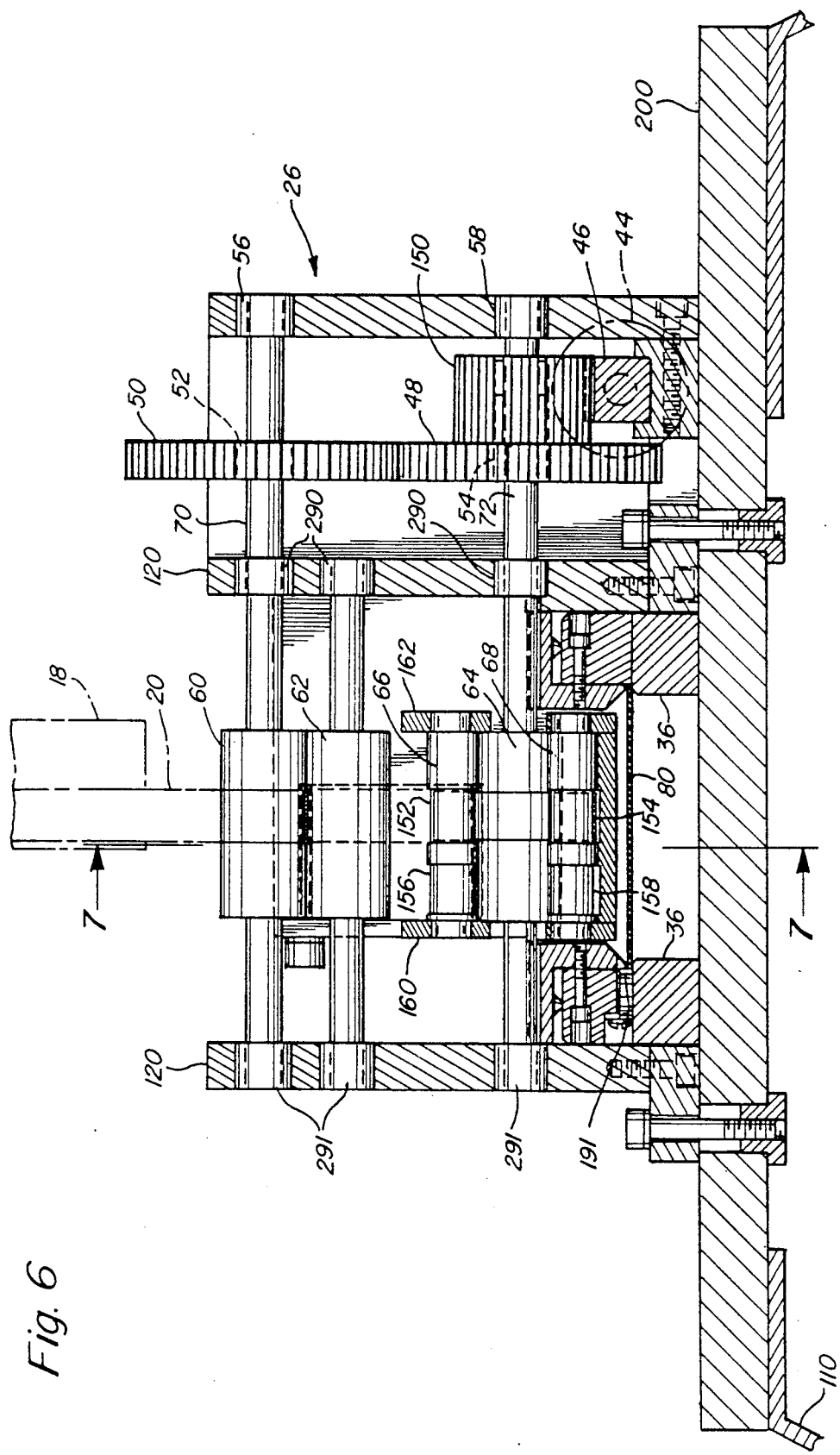
FIG. 6 is a cross sectional front view of the strip material supply elements of the apparatus shown in FIG. 1.

The strip material application element is detailed in cross-sectional front view in FIG. 6. The upper set of pinch rollers 60 and 62 and lower set of pinch rollers 64, 66 and 68 drive the strip material 20 from its free wheeling reel 18 to an accurate overlay position on a piece of card stock 80. Each of the upper and lower set of pinch rollers includes one driven roller 60 and 64, respectively, interconnected to an outboard drive axle 70 and 72, respectively. The non driven upper 62 and lower 66 and 68 guiding pinch rollers maintain pressure on the strip material driven by the driving pinch rollers to ensure minimum slippage. The upper set of rollers 60 and 62 and lower driven roller 64 are all fixed upon axles that are mounted into bearings 290 and 291 in a bearing frame 120. These bearings may all be clutch bearings capable of movement in only one direction. As stated, this clutch bearing arrangement facilitates the positive biasing of strip material from the roll 18 onto the card surface 80 without allowing any unintended rewind of material back onto the reel 18. The two driven outboard axles 70 and 72 are each interconnected with a gear 52 and 48, respectively. These gears are each mounted upon a driven axle with a concentric clutch bearing that allows torque to be applied only in the desired driving direction, while complete slippage of the gear relative to the axle occurs in the opposing direction. This arrangement facilitates the use of a reciprocating rack 46 driven by a linear motor 44 that, upon each stroke, rotates a driving gear 150 interconnected with the lower gear 48. As such, each time the rack undertakes a stroke, a predetermined amount of material web passes between one of the upper or lower sets of pinch rollers, allowing accurate gaging of strip material output.

The lower set of guiding pinch rollers 66 and 68 are mounted in self contained bearings 160 that allow their rapid removal. This facilitates the use of the apparatus with differing widths of strip material. As depicted in this figure, each of the rollers 66 and 68 contains a groove 152 and 154 machined to match the width of the strip material 20. This groove guides the output strip to ensure its accurate overlay positioning relative to the card surface 80. In this particular example, a second set of grooves 156 and 158 is also located upon each of the guiding rollers 66 and 68. According to this embodiment, multiple overlay of strips, or alternative positioning of strips upon the card is contemplated.

Figure 7:
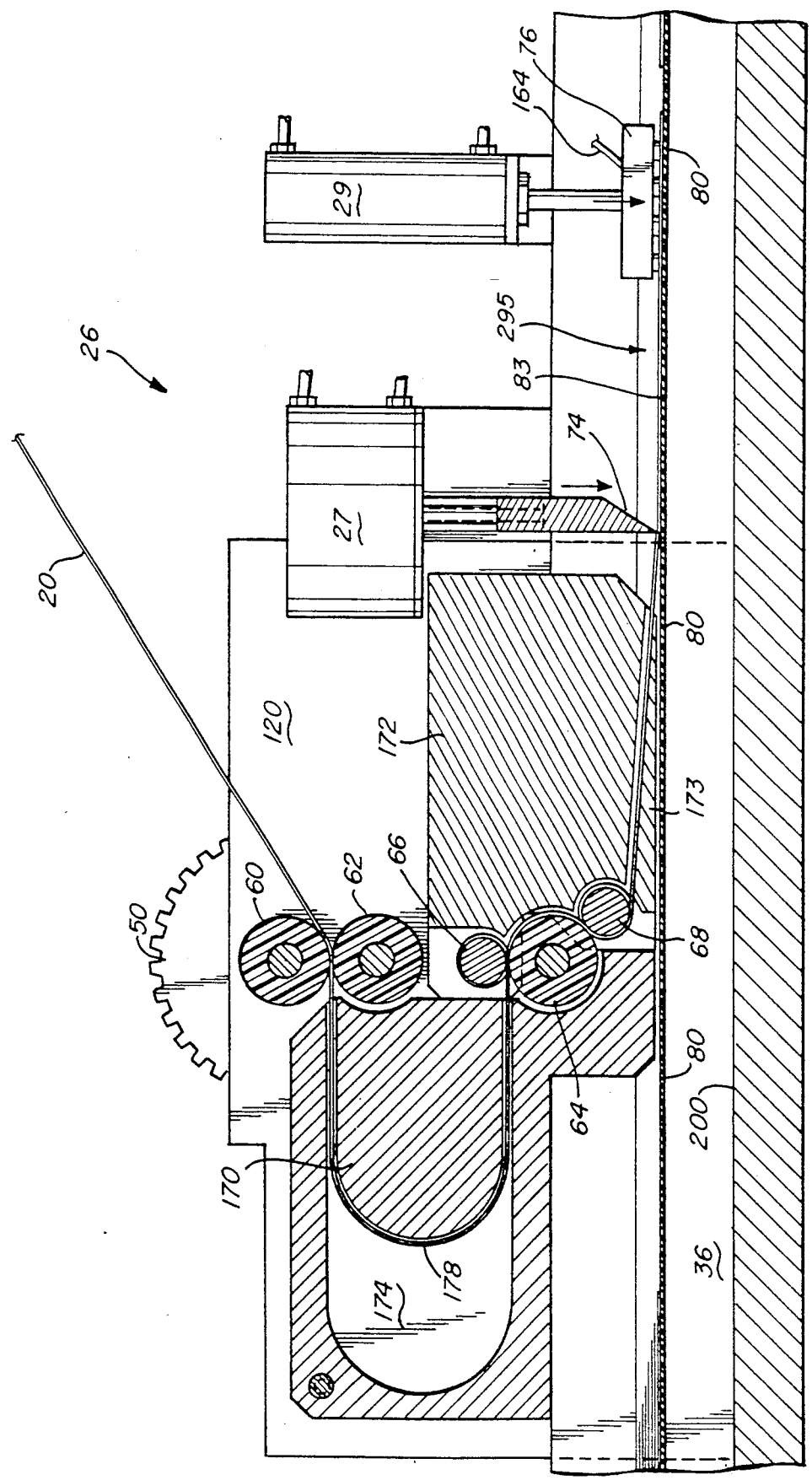
FIG. 7 is a cross sectional side view of the strip material supply elements including cutting and tacking elements as shown in FIG. 6.

In a side view of the strip material application element as shown in FIG. 7, the path of the strip material through the pinch rollers 20 is depicted. In this embodiment, each of the driven pinch rollers 60 and 64 is of like diameter as are their respective gears 50 and 48. This sizing results in even translation of the strip material through the upper and lower pinch roller sets. A chamber 174 is formed around a looped frame piece 170 to hold the slack material loop 178. This loop is created between the steps of inputting strip material from the reel source and delivering it to the overlay area. The strip material is guided to the overlay area 295 by the final guiding pinch roller 68 through a pair of forming frames 172 and 173.

Each overlaid piece of strip material is subsequently tacked to the surface of the card stock by the spot tacking unit 29 shown in FIG. 7 in a lowered position with its heating head 76 contacting the surface of the card 80. A wire 164 exits the tacking head that energizes the heating element. At the upstream end of the card, a cutting unit 27 then lowers its blade head 74 into contact with the strip material to separate it from the rest of the source strand as shown.

Figure 8:
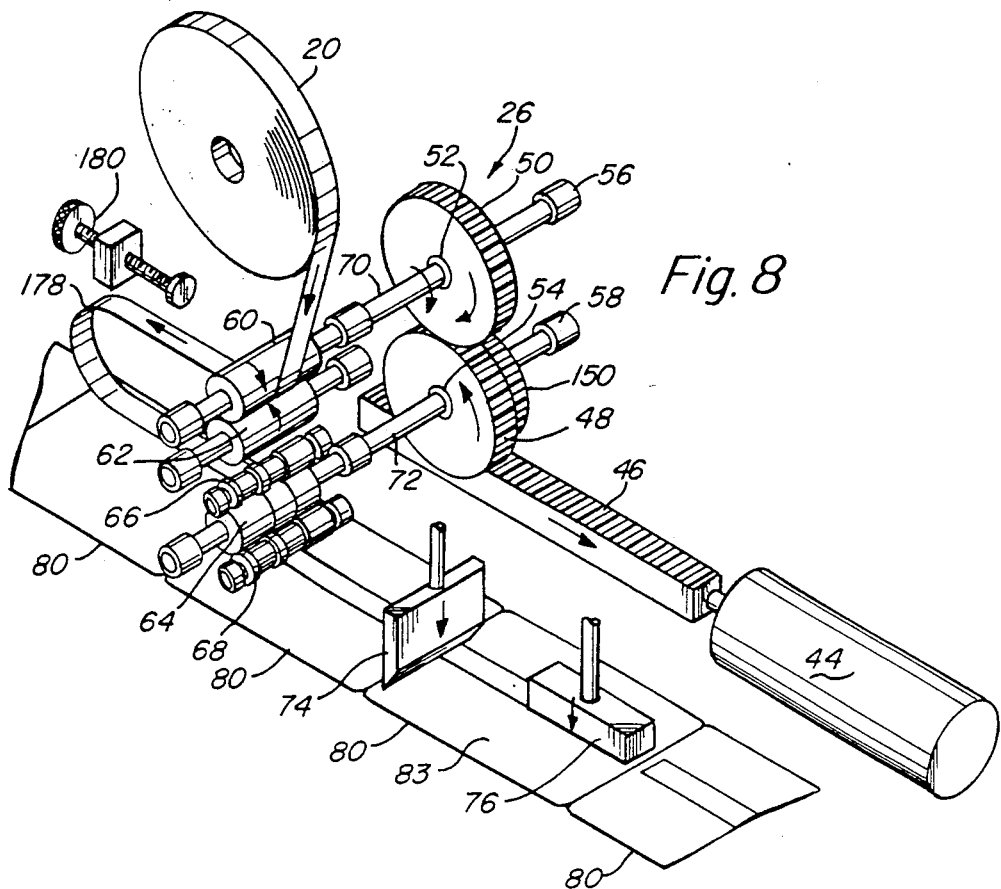
FIG. 8 is an exposed schematic perspective view depicting the drawing of strip material from a supply reel and into the feeding system of FIG. 7.
Figure 9:
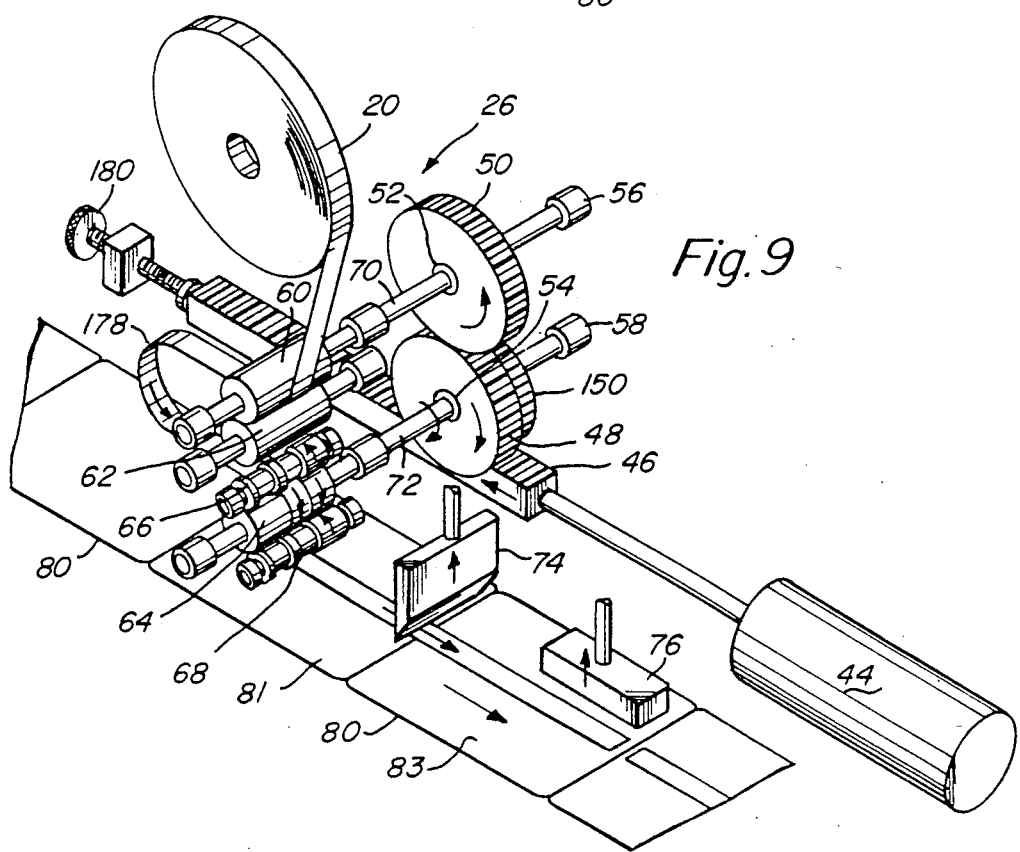
FIG. 9 is an exposed schematic perspective view depicting an outputting of a length of strip material to be overlaid on a card subsequent to the drawing operation shown in FIG. 8.

The overall operation of strip material overlay is depicted in FIGS. 8 and 9. In FIG. 8 strip material is first drawn from the source reel into the slack loop 178 when the linear motor motions the rack toward itself. In this direction of motion, the lower set of pinch rollers does not move due to the slippage of the rotating lower gear 48 relative to its axle 72. This slippage, however, drives the upper gear 50 in a direction that causes the upper clutch bearing 52 to lock, driving the upper pinch rollers to draw in strip material. At the same time, a piece of strip material is adhered to a further downstream card stock surface 80 by the tacking head 76 and then cut by the cutting head 74.

As the linear motor 44 then forces the rack 46 outward away from itself, as shown in FIG. 9, the lower gear 48 is rotated in an opposing direction from that shown in FIG. 8. As such, the lower clutch bearing 54 now locks about the axle 72 and lower pinch rollers now move drawing the slack strip material from the slack loop 178 out onto an overlay position while a card 81 is simultaneously drawn into the tacking and cutting position. The upper pinch rollers do not move at this point due to the slippage of the clutch bearing 52 of the upper gear 50 about its axle 70 in this direction of rotation. The rack travels until it encounters the adjustable stop 180. Adjustment of the screw on this stop allows simple and precise metering of the length of strip material paid out by the pinch rollers.

Figure 10:
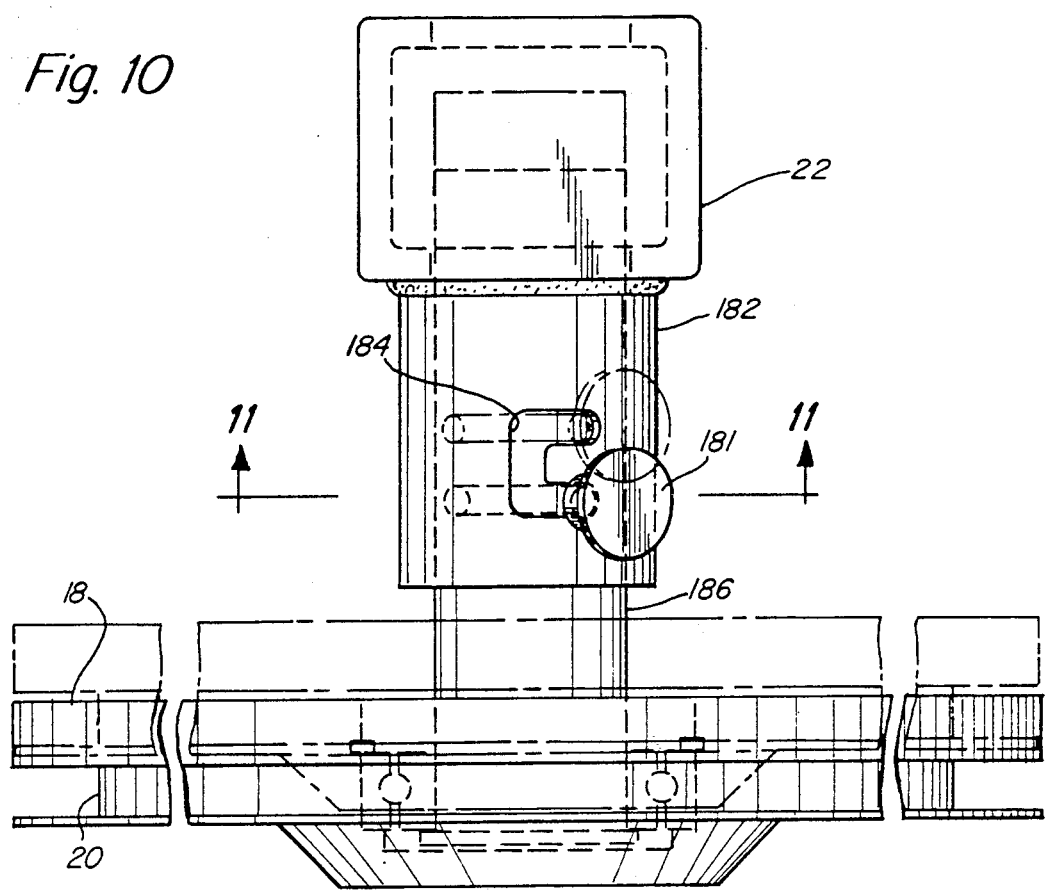
FIG. 10 is a cross sectional top view of the strip material reel, support and location adjustment pin of the apparatus shown in FIG. 1.
Figure 11:
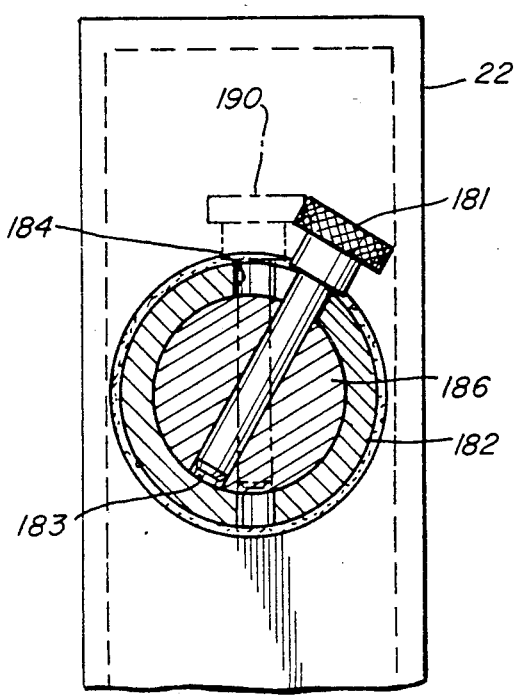
FIG. 11 is a more detailed cross-sectional side view of the location adjustment pin for securing the strip material reel into alternative locations as shown in FIG. 10.

The first 152 and 154 and second 156 and 158 groove positions in the lower guiding pinch rollers 66 and 68, respectively, as shown in FIG. 6, allow tape material to be positioned on alternative locations of the card stock. FIG. 10, thus, details the strip material reel 18 assembly in which either of the two locations corresponding to the alternative grooves can be selected on the feeding reel. This is accomplished using a locking pin 180 travelling in a U-shaped cut 184 machined into an outer axle 182 suspended from the reel support beam 22. The two legs of the "U" are spaced relative to the two groove locations on the lower guiding rollers. The pin 180 is lodged into a hole 183 in the concentric inner axle 186 and allows quick shifting from one position on the "U" to another. An exposed side view of this pin arrangement is depicted in FIG. 11. The rotation of the assembly to shift between width positions appears in phantom 190.

Figure 12:
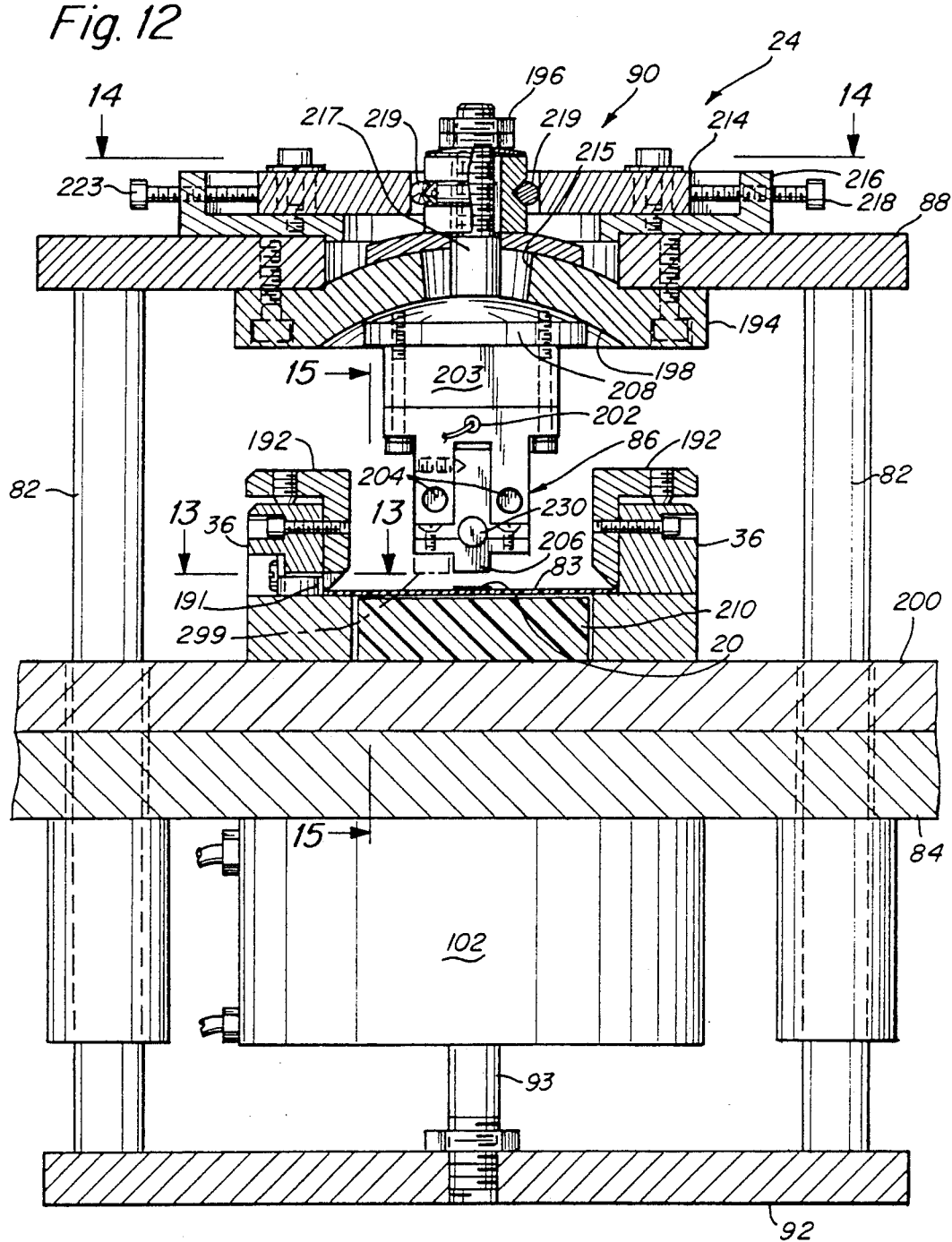
FIG. 12 is a cross sectional side view of the thermal lamination element of the apparatus shown in FIG. 1.

A cross-sectional side view of the thermal lamination element 24 is depicted in FIG. 12. A heating block 86 mounted upon the head is brought into contact with the surface of a card stock piece 80 in order to permanently seal the tacked strip material to the card surface. Heat is generated by a pair of electrical elements 204 and radiates to a die 206 in the base of the heating head 86. The positioning of the die corresponds with the location of the strip material. Since an alternative positioning of strip material is possible, a second alternatively positioned die 299 is depicted in phantom. The card stock 80 rests upon the rails 36 but is also fully supported on its underside at this location by a block 210. This block may be constructed of a phenolic resin with high strength and heat absorbing capabilities.

A proper functioning temperature must be maintained in the heating block and die surface. As such, a thermal monitoring element 202 may be mounted in the block to allow regulation of its temperature to a constant value. In order to conserve energy and protect the overall apparatus from heat damage, a block of insulating material 203 which may be ceramic compound, is disposed between the heating element section and the heating block base 208.

Figure 13:
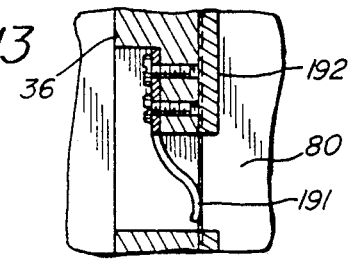
FIG. 13 is a more detailed cross sectional top view of the card tensioning leaf spring as shown in the thermal lamination element of FIG. 12.

It is also important that the card stock piece remain stationary during the lamination process. To this end, a tensioning leaf spring 190, as detailed in FIG. 13, is positioned to exert pressure upon one side of the card. Angled shoulders 192 simultaneously maintain a downward force on the card. The shoulders are cut in the area in which the spring is positioned. Further, since the cards are firmly positioned end-to end in the rails 36, they are relatively stationary along the process line direction between card transfer steps. Thus, the card is held positively in position in all degrees of freedom during lamination.

The thermal lamination unit in this embodiment contains, below the cabinet top plate 200, a pneumatically operated linear motor 102. In order to place the heating block head in pressurized contact with the card surface, the linear motor forces out a piston rod 93 that moves a base plate 92 downward pulling with it the four support rods 82. These rods 82 pull down the head plate 88 of the lamination head. This head plate carries the heating block 86 and an adjusting unit 90 that allows fine adjustment of the contact angle of the heating block relative to the card surface as well as the block's rotational positioning in the plane of the card surface. The heating block base 208 rests within a hemispherical receiving block 194. This receiving block 194 contains an enlarged hole 215 that allows an armature 217 extending from the base of the heating block 208 to displace in a spherical arc. The armature is tightened against the hemispherical block surface to lock the head in a predetermined angular position, using a pair of locking nuts 196.

Fine adjustment of the heating block angle within the receiving block 194 is accomplished by loosening the armature nuts 196 and turning a group of adjustment screws as shown in FIG. 12. The armature is mounted in bearings 219 within a supporting plate 214. This supporting plate is displaceable relative to the head plate 88. As such, movement of the supporting plate using the adjustment screws (element 218) results in a pivotal displacement of the armature.

Figure 14:
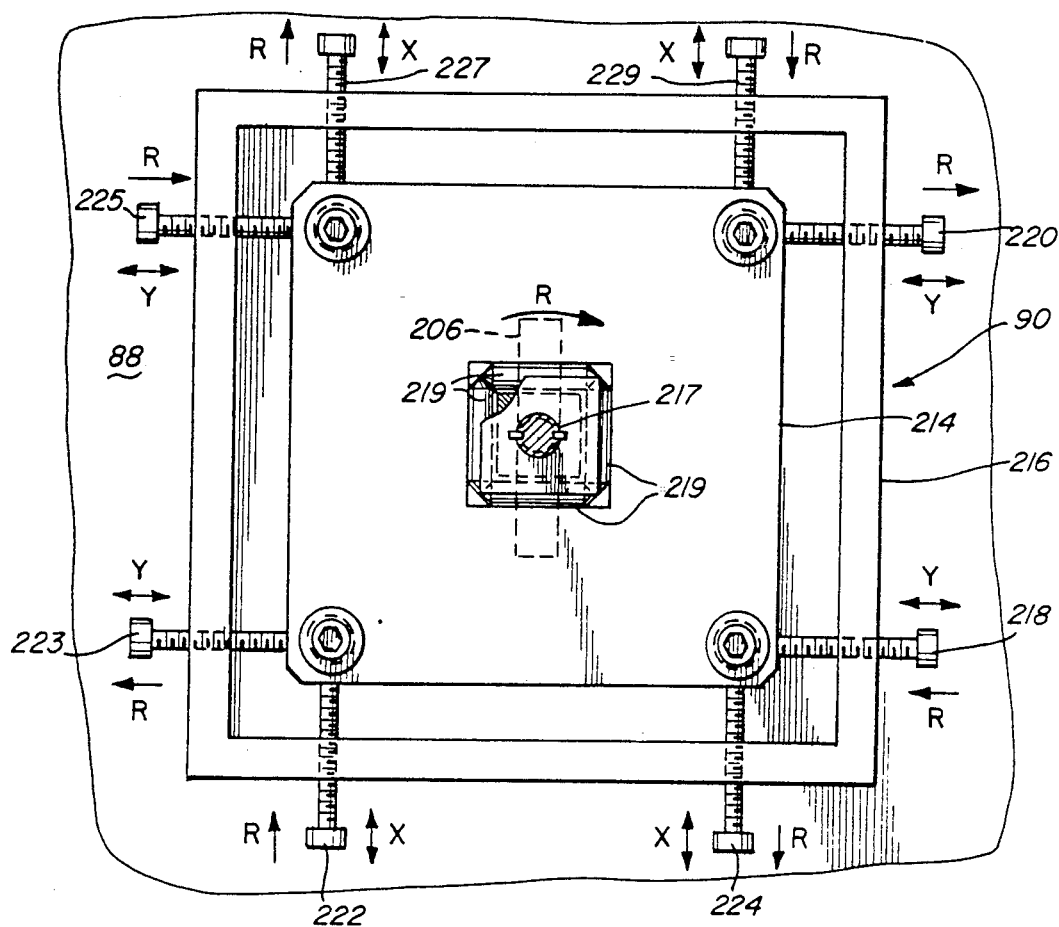
FIG. 14 is a partial top view of the lamination head locational adjusting system for the thermal lamination element of FIG. 12.

The use of the adjustment screw system is depicted in more detail in FIG. 14. By activation of a given screw or group of screws, the angle of the armature may be altered as well as the heating block's planar rotational positioning relative to the card surface. Generally, translation of all the screws upon opposing sides in the same direction results in an angular displacement of the heating block. Displacing the screws in alternating directions results in a rotation of the heating block head about the armature axis as depicted by the letter R and the rotational arrow.

Figure 15:
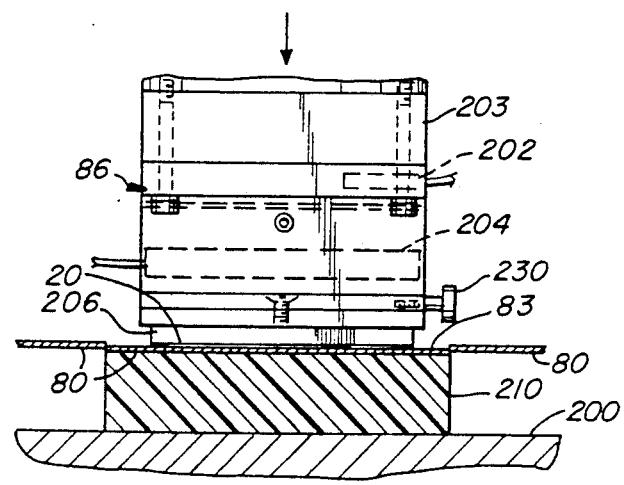
FIG. 15 is a partial exposed side view of the heating block of the thermal lamination element of FIG. 12.

A side view of the heating block with operational elements shown in phantom is depicted in FIG. 15. The heating block at this point is in contact with the surface of a piece of card stock. A knob 230 is shown. This knob is utilized for placement and removal of heating block dies 206 for added versatility.

Figure 16:
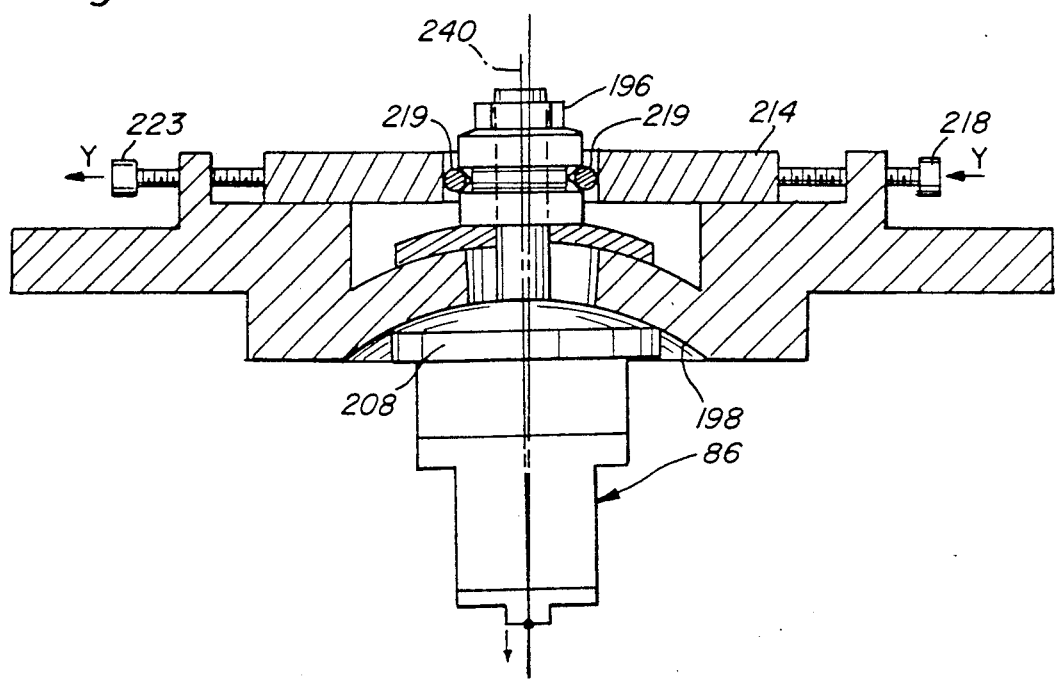
FIG. 16 is a somewhat schematic cross sectional side view of an adjustment of the heating block angle for the thermal lamination element of FIG. 12.

The results of applying opposing adjustment screws is depicted in FIG. 16. Left 223 and right 218 adjustment screws are rotated to move the supporting plate 214 in a leftward direction resulting in an offset angle 240 in the heating block 86 relative to perpendicular with respect to a card surface. The bearings 242 in the supporting plate 214 permit the rotation of the armature 196.

It should be understood that the preceding is merely a detailed description of a preferred embodiment. It will be obvious to those skilled in the art that various modifications can be made without departing from the spirit or scope of the invention. The preceding description is not meant to limit the scope of the invention.

What is claimed is:

1. An apparatus for applying a strip material to the surface of plastic card stock comprising:
    means for storing blank plastic card stock pieces;
    means for transferring in a downstream direction plastic card stock from said means for storing;
    means, positioned downstream of said means for transferring, for supplying a predetermined length of strip material from a source at an overlaid position on each of said plastic card stock pieces;

means, positioned downstream of said means for supplying, for cutting said strip material to a predetermined length;

means, positioned downstream of said means for cutting, for spot tacking said overlaid strip material to said card stock surface, said means for spot tacking operating prior to said means for cutting; and moving lamination head means, positioned downstream of said means for spot tacking, for adhering permanently said strip material to each of said plastic card stock pieces, said lamination head means being disposed to contact and withdraw from said surface of each plastic card stock piece to contact it with predetermined pressure for a predetermined time in the location of tacked and cut strip material while said card stock piece is stationarily positioned relative to said lamination head means.

2. An apparatus as set forth in claim 1 wherein said means for transferring includes rail means for directing card stock through the apparatus said rails suspending the card stock above a base of the apparatus so that a substantial portion of a side of the card stock facing the base is out of contact with the base.

3. An apparatus as set forth in claim 2 wherein said means for transferring includes reciprocating sliding finger means disposed to translate between rails of the rail means for pushing card stock pieces off said means for storing and consecutively down said rail means.

4. An apparatus as set forth in claim 3 wherein said means for storing includes means for stacking said card stock pieces having adjustable baffle means for separating a stack of card stock pieces into a large and a significantly smaller stack, said smaller stack positioned directly in proximity to said sliding finger means and said larger stack being suspended completely out of contact with said smaller stack with a card moved between said large and said smaller stack each time a card is transferred by said means for transferring.

5. An apparatus as set forth in claim 1 wherein said means for supplying comprises a first and second pinch roll set means geared together to allow said first set to input strip material from a source and to allow said second set, subsequent to input, to output strip material to overlay said plastic card stock, wherein a loop of slack strip material is disposed between said first and second pinch roll sets to accumulate for storage a metered length of strip material between input by said first pinch roll set and output by said second pinch roll set.

6. An apparatus as set forth in claim 5 wherein said means for supplying includes a source of strip material that is a supply reel.

7. An apparatus as set forth in claim 5 wherein said first and second pinch roll sets each include a gear having clutch bearing means that allows complete slippage in one direction of rotation and complete transfer of torque to the roll set in an opposite direction of rotation corresponding to the direction of strip material feeding.

8. An apparatus as set forth in claim 7 wherein each of said first and second pinch roll sets include at least one roller having a clutch bearing means that allows said roller to travel only in said direction of strip material feeding.

9. An apparatus as set forth in claim 8 wherein said first and second pinch roll sets include a gear driving means that is a translating moveable gear rack interconnected with one of said gears.

10. An apparatus as set forth in claim 9 wherein said means for transferring and said gear drive means each include linear motors that operate in conjunction with each other.

11. An apparatus as set forth in claim 10 wherein said linear motors each include means for adjusting their stroke travel.

12. An apparatus as set forth in claim 11 wherein said means for cutting includes a moving cutting head means that contacts and withdraws from the surface of said strip material.

13. An apparatus as set forth in claim 1 wherein said means for spot tacking includes a moving heating element means mounted in a position above said overlay position to contact and withdraw from the surface of said strip material to tack it to said plastic card stock.

14. An apparatus as set forth in claim 13 wherein said means for spot tacking includes a linear motor to bring said heating element into contact with said overlaid strip material.

15. An apparatus as set forth in claim 14 wherein said means for cutting includes cutting control means to operate said spot tacking means prior to operating said cutting head means to cut said strip material only after it has been secured to said plastic card stock surface.

16. An apparatus as set forth in claim 2 wherein said lamination head means includes heating block means having adjustable electrical heater means to provide lamination heat to said heating block means.

17. An apparatus as set forth in claim 16 wherein said heating block means includes removable end die means shaped to accurately overlay said strip material on said plastic card stock and constructed of material with a high thermal conductivity.

18. An apparatus as set forth in claim 16 wherein said heating block means includes insulation means, disposed between said heating block and said lamination head means, to reduce unwanted heating loss from said heating block means.

19. An apparatus as set forth in claim 2 wherein said rail means include, disposed therebetween and positioned relative to said lamination head means, heat resistant backing block means to allow pressure to be applied to said plastic card stock.

20. An apparatus as set forth in claim 2 wherein said lamination head means is brought into contact with said strip material by linear motor means.

21. An apparatus as set forth in claim 20 wherein said linear motor is a pneumatic actuator.

22. An apparatus as set forth in claim 16 wherein said heating block means includes temperature probe means to regulate heating block temperature to a predetermined value.

23. An apparatus as set forth in claim 2 wherein said lamination head means includes rotational position adjustment means to allow changes in the rotational position of said heating block within the plane of the surface of said plastic card stock.

24. An apparatus as set forth in claim 16 wherein said lamination head means includes angular adjustment means that allows alteration of the contact angle of said heating block relative to the plane of the surface of said plastic card stock.

25. An apparatus as set forth in claim 1 further comprising means, positioned downstream from said means for adhering, for cooling said laminated plastic card stock.

26. An apparatus as set forth in claim 25 wherein said means for cooling includes a venturi-shaped multi-ducted air flow source located to deliver air flow to the surface of said plastic card stock.

27. An apparatus as set forth in claim 2 further comprising output stacking means, positioned downstream of said means for cooling, to collect completed plastic card stock pieces.

28. An apparatus as set forth in claim 27 wherein said output stacking means includes means for raising new completed plastic card stock pieces from said rail means into the bottom of a stack of completed plastic card stock pieces.

29. An apparatus as set forth in claim 28 wherein said means for raising includes spring loaded baffle means to support the bottom of said stack of completed plastic card stock pieces above the level of said rail means, said loaded baffle means mounted to displace for providing full clearance for a plastic card stock as it passes therethrough to be placed upon the bottom of said stack.

30. An apparatus as set forth in claim 3 wherein said finger means includes shock absorbing adjustable stop means to regulate the distance of travel of said sliding finger means.

31. An apparatus as set forth in claim 1 further comprising static electricity removal means positioned directly downstream of said means for storing to neutralize static on said plastic card stock.

32. An apparatus as set forth in claim 1 wherein each of said plastic card stock pieces is a single commercially accepted credit card-style card.

33. An apparatus as set forth in claim 1 wherein said strip material is composed of a paper-like material.

34. An apparatus as set forth in claim 3 wherein said reciprocating sliding finger includes motor driven engagement means for placing said sliding finger in interfering contact with the upstream edge of one of said card stock pieces when pushing, and for placing said sliding finger completely out of contact with said card stock pieces in said means for storing while said sliding finger is returning to transfer the next card stock piece.

35. An apparatus as set forth in claim 34 wherein said engagement means is a pivot means that allows said finger to pivot into and out of engagement with said card stock pieces.

36. An apparatus as set forth in claim 34 wherein said engagement means includes linear motor means disposed opposite said pivot means on said sliding finger means to effect pivoting.

37. An apparatus as set forth in claim 1 wherein the predetermined length of strip material is less than an overall length of each of the card stock pieces taken along the downstream direction.

* * * * *

UNITED STATES PATENT AND TRADEMARK OFFICE
CERTIFICATE OF CORRECTION

PATENT NO. : 5,045,144

DATED : September 3, 1991

INVENTOR(S) : Jaime Bonomi

It is certified that error appears in the above-identified patent and that said Letters Patent is hereby corrected as shown below:

Title page, item [75]
Please change the name of the inventor from Jaime Bonemi to
-- Jaime Bonomi --.

Signed and Sealed this

Twenty-first Day of December, 1993

Attest:

BRUCE LEHMAN

*Attesting Officer*    *Commissioner of Patents and Trademarks*